(12) United States Patent
Kurokawa et al.

(10) Patent No.: US 7,442,138 B2
(45) Date of Patent: Oct. 28, 2008

(54) RATCHET TYPE TENSIONER

(75) Inventors: Yoshio Kurokawa, Osaka (JP);
 Shigenobu Sugasawa, Osaka (JP);
 Yutaka Minami, Osaka (JP); Kaori Mori, Osaka (JP); Timothy Marx, Westfield, MA (US)

(73) Assignee: Tsubakimoto Chain Co., Osaka (JP)

( * ) Notice: Subject to any disclaimer, the term of this patent is extended or adjusted under 35 U.S.C. 154(b) by 106 days.

(21) Appl. No.: 11/584,443

(22) Filed: Oct. 20, 2006

(65) Prior Publication Data
US 2007/0142144 A1     Jun. 21, 2007

(30) Foreign Application Priority Data
Nov. 29, 2005     (JP) ............................ 2005-344637

(51) Int. Cl.
*F16H 7/08*     (2006.01)
(52) U.S. Cl. ..................................... 474/110
(58) Field of Classification Search ................. 474/101, 474/109, 110, 111, 140; 74/575, 577 R, 74/577 S, 577 M
See application file for complete search history.

(56) References Cited

U.S. PATENT DOCUMENTS

| 3,484,831 | A | * | 12/1969 | Higuchi ...................... 403/103 |
| 3,710,634 | A |   | 1/1973  | Tamaru et al. |
| 4,125,287 | A | * | 11/1978 | Paulisch .................. 297/344.1 |
| 5,908,363 | A |   | 6/1999  | Suzuki |
| 6,478,703 | B2 |  | 11/2002 | Suzuki |
| 2007/0072713 | A1 | * | 3/2007 | Slopsema et al. ........... 474/101 |

FOREIGN PATENT DOCUMENTS

| FR | 2646938 A3 | * | 11/1990 |
| JP | 2001-214957 |  | 8/2001 |
| JP | 2004-308624 |  | 11/2004 |

* cited by examiner

*Primary Examiner*—Vicky A Johnson
(74) *Attorney, Agent, or Firm*—Howson & Howson LLP

(57) ABSTRACT

In a ratchet type chain tensioner, having a toothed rack on its plunger and a pawl cooperable with the rack, a recess is provided between the front end of the rack and the protruding end of the plunger. In the initial stages of operation of the tensioner, the pawl can enter the recess while permitting the plunger to protrude and retract freely within a limited range. Thereafter, when the chain controlled by the tensioner becomes elongated, the pawl cooperates with the rack to limit retraction of the plunger.

3 Claims, 6 Drawing Sheets

RATCHET TYPE TENSIONER

CROSS-REFERENCE TO RELATED APPLICATION

This application claims priority on the basis of Japanese patent application 2005-344637, filed Nov. 29, 2005. The disclosure of Japanese application 2005-344637 is hereby incorporated by reference.

FIELD OF THE INVENTION

This invention relates to a ratchet type tensioner used for applying proper tension to a timing chain in a vehicle engine or the drive chain of a balancer or the like.

BACKGROUND OF THE INVENTION

In a typical timing transmission in a vehicle engine, an endless, flexible, traveling chain transmits rotation from a crankshaft sprocket to one or more camshaft sprockets. A ratchet tensioner is typically used to maintain proper tension in the slack side of the timing chain, that is, the side moving from away the crankshaft sprocket, in order to suppress vibration. The ratchet tensioner has a protruding plunger, and is mounted on the engine body in such a way that a front end of its plunger presses against the back of a pivoted tensioner lever, urging a shoe on the tensioner lever into sliding contact with the chain. A typical timing transmission using such a tensioner is described in U.S. Pat. No. 6,478,703.

In the case of a balancer, two balance shafts are provided with gears that mesh with each other, and a balancer chain is in mesh with a sprocket mounted on one balance shaft and a crankshaft sprocket. The balancer also includes a ratchet tensioner for maintaining proper tension in the balancer chain, as described in Japanese Laid-open Patent Publication No. 2004-308624.

An example of a conventional ratchet type tensioner is shown in FIG. 7. In the tensioner 21, a plunger 24 is slidable in a plunger-accommodating hole 23 in a tensioner body 22, and protrudes forward from the front surface of the tensioner body. A compression spring 26 bears against the bottom of the plunger-accommodating hole in the tensioner body and extends through an opening at the rear of the plunger into a blind hole 25 inside the plunger 24, its opposite end bearing against the closed end of the blind hole. The spring 26 continuously biases the plunger 24 in the protruding direction.

A longitudinal rack 27 is formed on the outer circumferential surface of the plunger 24. The rack 27 comprises a series of rack teeth disposed at a uniform pitch over the entire length of the rack. The length of the rack is determined in accordance with the expected amount of loosening of the timing chain.

A pawl 29 is pivotably supported on the tensioner body 22 by a shaft 28 at a position adjacent the rack 27. The pawl 29 is continuously biased clockwise by a spring 30 held in compression between the pawl and the bottom of a spring-receiving hole in the tensioner body. A first pawl tooth 29a, and a second pawl tooth 29b spaced rearward of the first pawl tooth 29a, are engageable with the rack teeth 27a. The pawl 29 and the rack teeth 27a form a "backstop" mechanism 31 that blocks backward displacement of the plunger 24.

The first pawl tooth 29a, formed on the front side of the outer edge of the pawl 29, has a triangular shape corresponding to the shape of rack teeth 27a, and engages with a space between rack teeth substantially without a clearance. The second pawl tooth 29b is smaller than the first pawl tooth 29a.

That is, its height, measured along a direction approximately perpendicular to the plunger axis, is lower than the height of pawl tooth 29a. Tooth 29b is formed at a location spaced rearward from tooth 29b by at least three times the rack tooth pitch. When the first pawl tooth 29a is engaged between two rack teeth 27a substantially without any clearance, the second pawl tooth 29b is out of contact with the rack teeth 27a, and does not restrict movement of the plunger 24. When the chain loosens by an amount permitting the plunger to protrude through a distance corresponding to half the width of one rack tooth 27a, the plunger 24 begins to move forward and the first pawl tooth 29a rides over the top of a rack tooth 27a. The second pawl tooth 29b then comes into contact with another rack tooth 27a, causing the pawl to rotate clockwise, and causing the first pawl tooth 29a to be engaged with another rack tooth 27a. While the second pawl tooth 29a is between two rack teeth, the plunger 24 can move slightly forward or backward in accordance with the looseness or tension in the chain, and the plunger 24 applies proper tension to the chain.

Both in the case of a timing chain and in the case of a chain for driving auxiliary equipment such as a balancer or the like, there are engines in which it would be desirable to have the backstop mechanism of a ratchet tensioner function only when the chain has become elongated after a lengthy period of operation. However, in a conventional ratchet tensioner, the length of the rack is such that it is opposite the ratchet pawl throughout the entire range of movement of the plunger. In such a tensioner, if the backstop mechanism is effective to prevent jumping of the chain on the sprocket teeth when the chain becomes elongated, it can exhibit insufficient backlash in the initial stages of its operation before the chain has become elongated. The tensioner cannot operate reliably in an engine that requires a tensioner having a backstop mechanism that functions in one region of plunger movement and does not function in another region of plunger movement.

Accordingly, an object of the invention is to solve the above-mentioned problems and to provide a ratchet tensioner that can be adapted to an engine of the kind that requires a tensioner having a backstop mechanism that functions only when the chain has become elongated, and does not function in the initial stages of operation of the chain.

SUMMARY OF THE INVENTION

In the improved ratchet tensioner according to the invention, as in the case of a conventional ratchet tensioner a plunger is slidable in a longitudinal direction in the plunger-accommodating hole of a tensioner body. The plunger has a front end that protrudes from the plunger-accommodating hole and a rear end within the plunger-accommodating hole. A plunger spring urges the plunger in the protruding direction, and a ratchet mechanism is provided for limiting movement of the plunger in a retracting direction. The ratched mechanism comprises a toothed rack having a set of rack teeth formed on the plunger and arranged in a longitudinal row, a pawl pivotably supported on the tensioner body for engagement with the rack teeth, and a spring biasing the pawl toward the rack teeth.

However the improved ratchet tensioner according to the invention differs from the conventional ratchet tensioner in that it has a recess formed in the plunger at a location between the toothed rack and the front end of the plunger. The recess is deeper than the tooth gap bottoms of the rack. Thus, the pawl can enter the recess without engaging the bottom wall of the recess, and permits the plunger to move freely in both its protruding and retracting directions through a limited range.

In a preferred embodiment, the plunger is provided with an additional tooth at a located between the recess and the front end of the plunger. The pawl is engageable with the additional tooth to hold the plunger in a fully retracted position, and prevents the plunger from jumping out of the plunger-accommodating hole prior to installation of the tensioner in an engine.

A protrusion engageable by the pawl is preferably formed on the tensioner body to limit pivoting movement of the pawl, thereby preventing the pawl from contacting the bottom wall of the recess in the plunger when the pawl enters the recess.

When the plunger is retracted to a position in which the pawl enters the recess of the plunger forward of the toothed rack, the ratchet mechanism does not function as a backstop mechanism. Thus, the punger is free to move forward and backward within a limited range. Excessive forward movement of the plunger is prevented, and proper tension can be maintained in the chain. However, as the plunger gradually moves forward with elongation of the chain over time, the pawl can engage the rack teeth, and the ratchet mechanism becomes operative to prevent the elongated chain from jumping the sprocket teeth. Thus, the ratchet tensioner of the invention can be adapted to an engine which requires a backstop mechanism having a non-operating range and an operating range, and in which the backstop mechanism becomes effective after the chain has become elongated over time.

When an additional tooth is provided forward of the recess in the plunger, the pawl can be used to hold the plunger in a fully retracted condition when the tensioner is shipped and transported, and when the tensioner is being installed in an engine either during initial assembly of the engine or in the process of repair of the engine.

A protrusion is provided to prevent excessive pivoting of the ratchet pawl, and thus prevents contact between the pawl and the bottom of the recess, especially when the bottom of the recess is flat. Furthermore, the protrusion prevents the pawl biasing spring from jumping out of its retaining hole as a result of excessive pivoting movement of the pawl.

DETAILED DESCRIPTION OF THE PREFERRED EMBODIMENT

Figure 7:
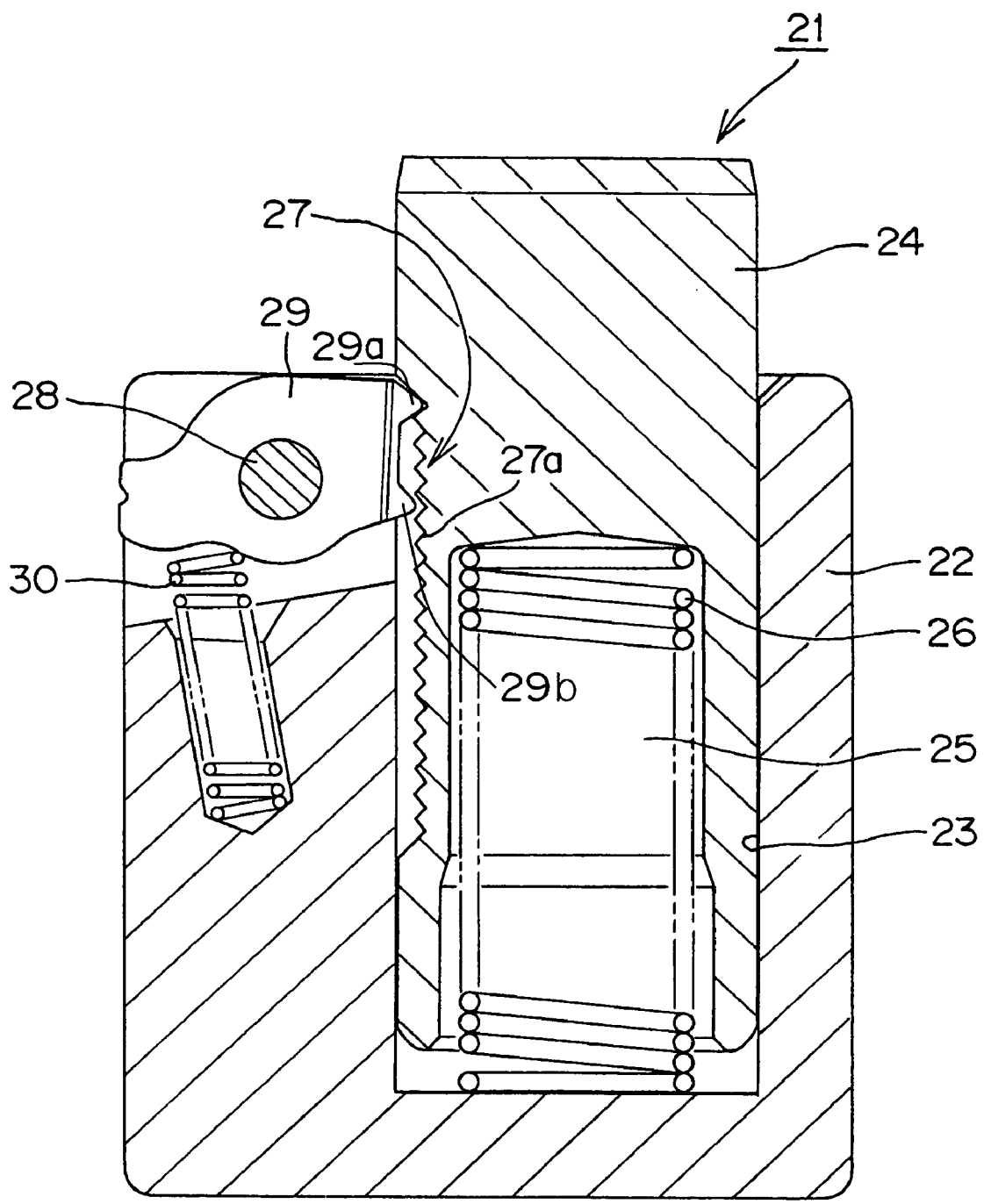
FIG. 7 is a cross-sectional view of a conventional ratchet type tensioner.

The ratchet type tensioner 1 of the invention differs from the conventional ratchet type tensioner 21 shown in FIG. 7 in the shape of the rack formed on the outer circumferential surface of its plunger, and in that a protrusion 2a is provided in the tensioner body 2 for engagement by the pawl.

Figure 1:
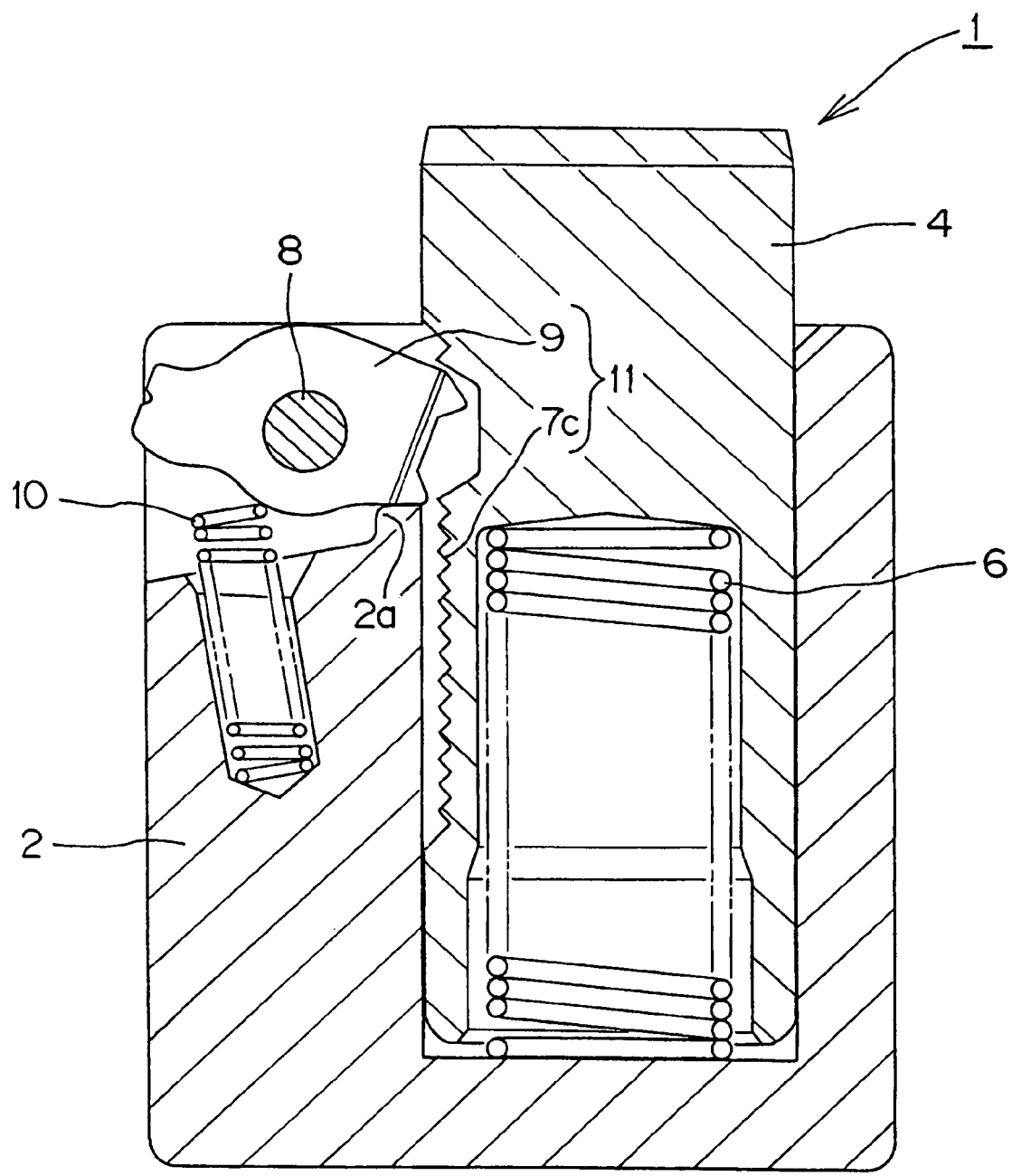
FIG. 1 is a cross-sectional view of a ratchet type tensioner according to the invention.
Figure 5:
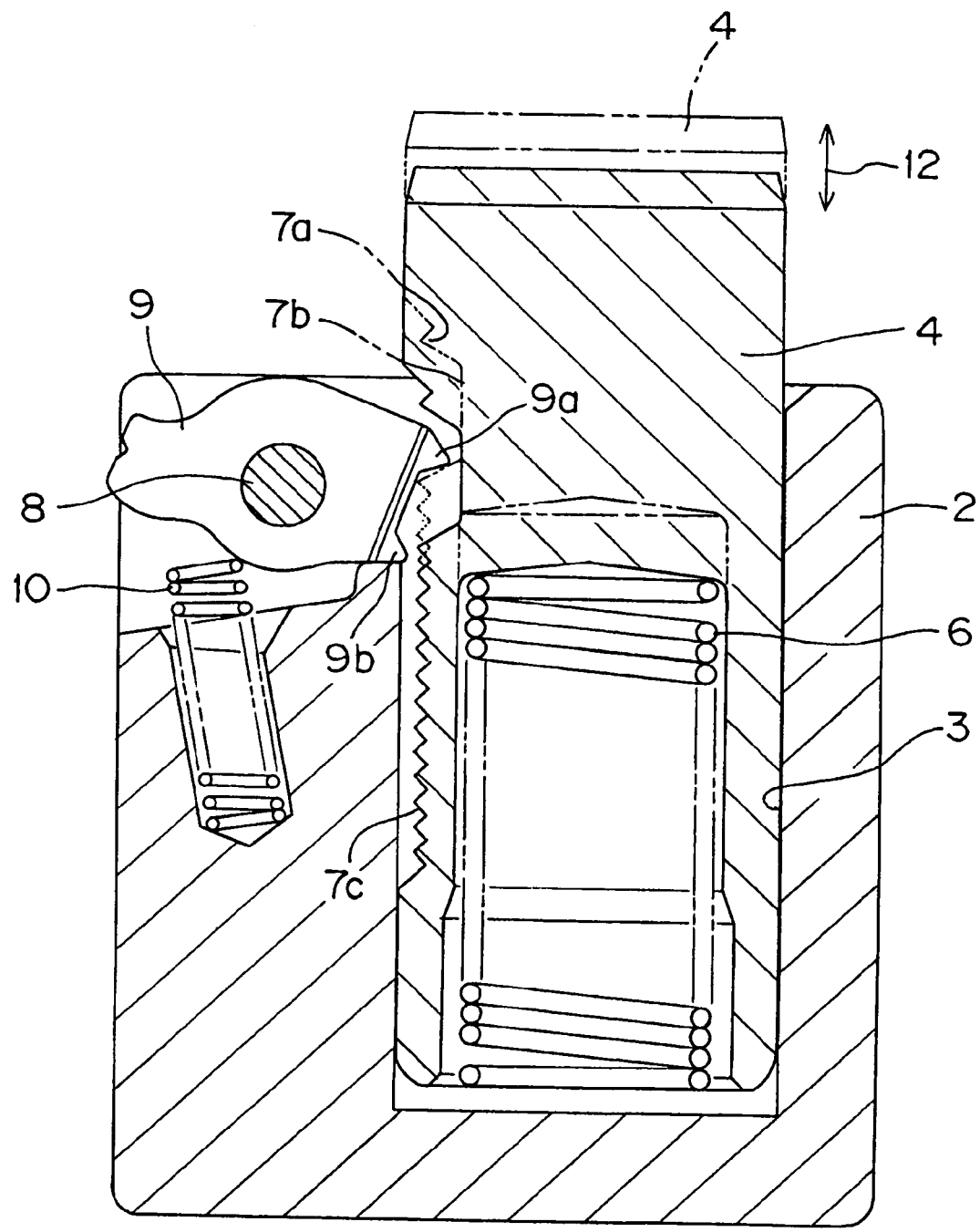
FIG. 5 is an explanatory cross-sectional view showing the tensioner in a state in which its ratchet does not perform a backstop function.
Figure 6:
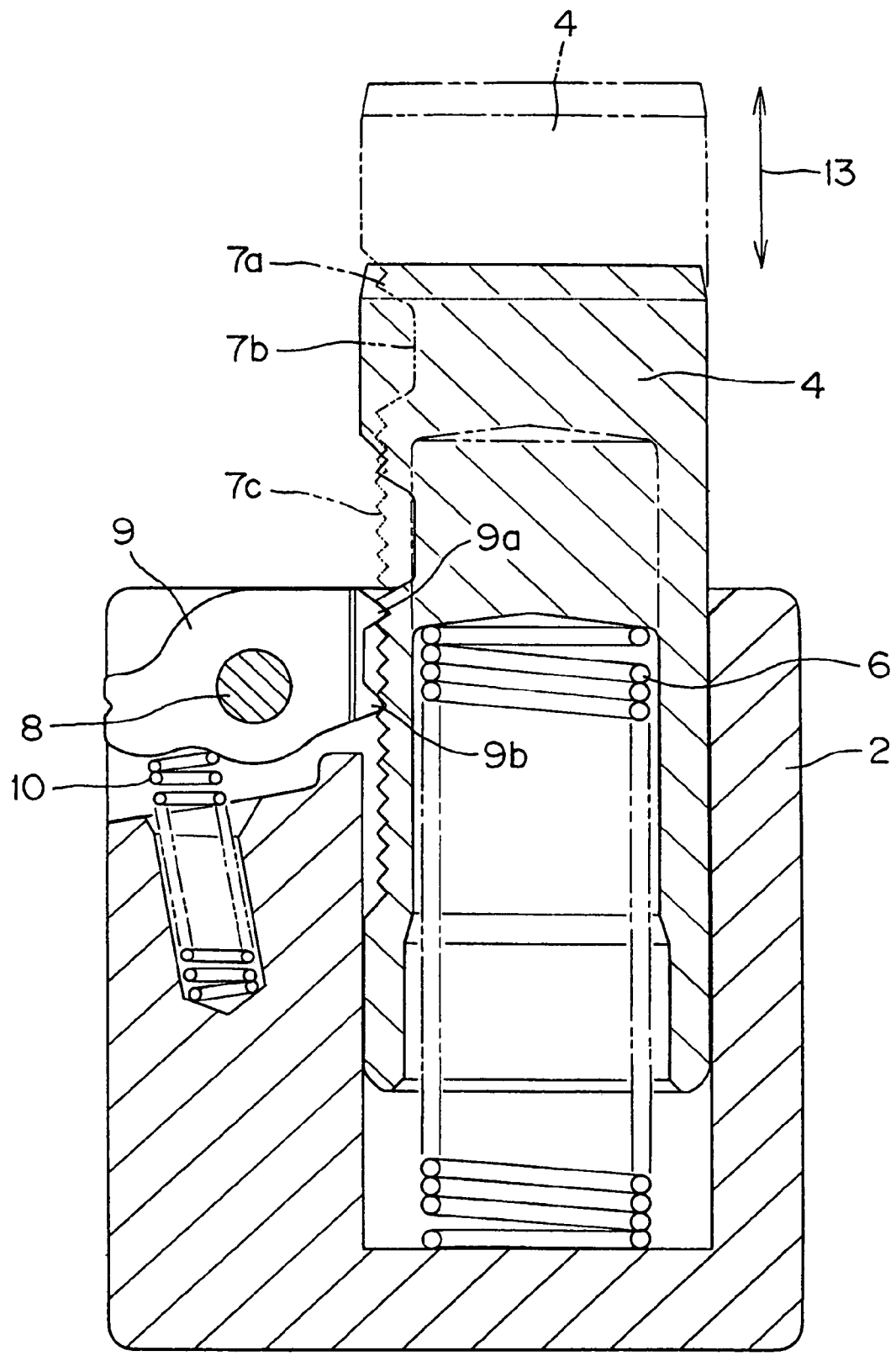
FIG. 6 is an explanatory cross-sectional view showing the tensioner in a state in which its ratchet performs a backstop function.

As shown in FIG. 1, the tensioner 1 includes a plunger 4, which is fits slidably into a plunger-accommodating hole 3 (FIG. 2) of tensioner body 2 so that the plunger 4 can be urged in the protruding direction by a compression spring 6. A ratchet pawl 9 is pivotably supported on a pivot shaft 8 provided in a hole 8a (FIG. 2) in the tensioner body 2, and biased by a spring 10 provided in hole 10a (FIG. 2) in the tensioner body. The pawl 9 has a first pawl tooth 9a (FIGS. 4, 5 and 6), which is engageable with rack teeth 7c of the rack 7, as shown in FIG. 6, in order to to block retraction of the plunger 4. Thus, the pawl 9 and the rack teeth 7c serve as a backstop mechanism 11. A second pawl tooth 9b is provided at a location rearward with respect to the pawl tooth 9a.

Figure 3:
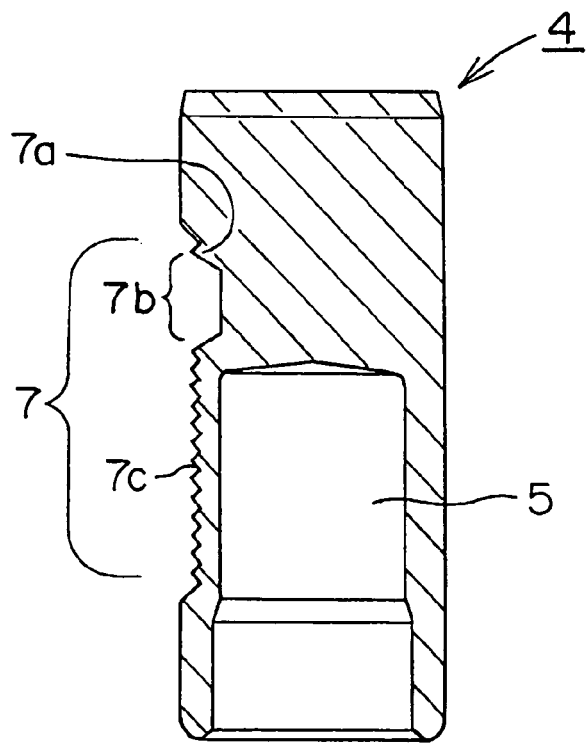
FIG. 3 is a cross-sectional view of the plunger.

As shown in FIG. 3, a tooth 7a is provided adjacent the front end of the rack for preventing jumping of the plunger out of the plunger-accommodating hole, and a recess 7b is provided immediately rearward of tooth 7a. The recess in the plunger preferably has a flat bottom. The flat bottom can be formed easily by milling or the like, and provides clearance for the pawl without impairing the strength of the plunger. The rack teeth 7c, which cooperate with pawl 9 to perform the backstop function, are provided rearward of recess 7b. The bottom of recess 7b (which is a flat vertical surface in FIG. 3) is deeper than the tooth gap bottoms of tooth 7a and rack teeth 7c so that the first pawl tooth not come into contact with the bottom of recess 7b.

Figure 2:
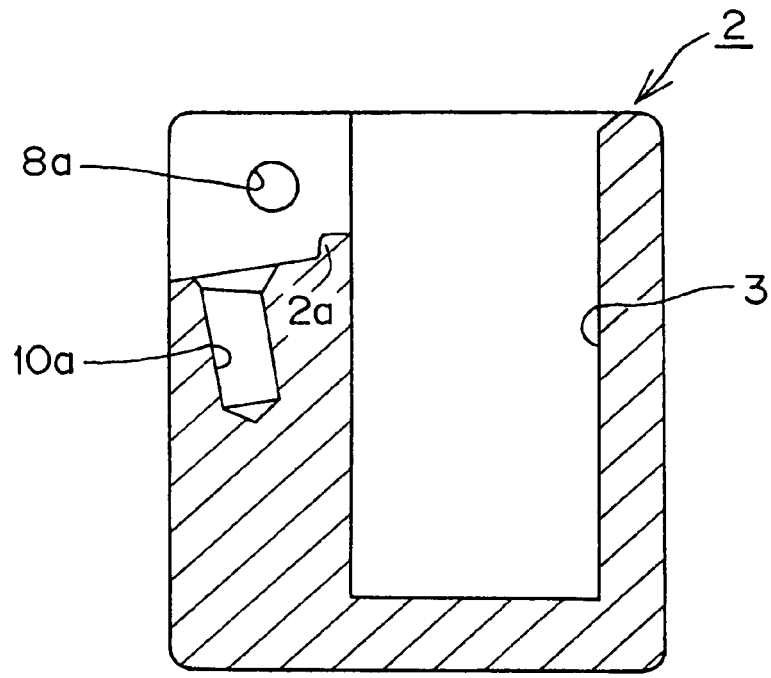
FIG. 2 is a cross-sectional view of the tensioner body.
Figure 4:
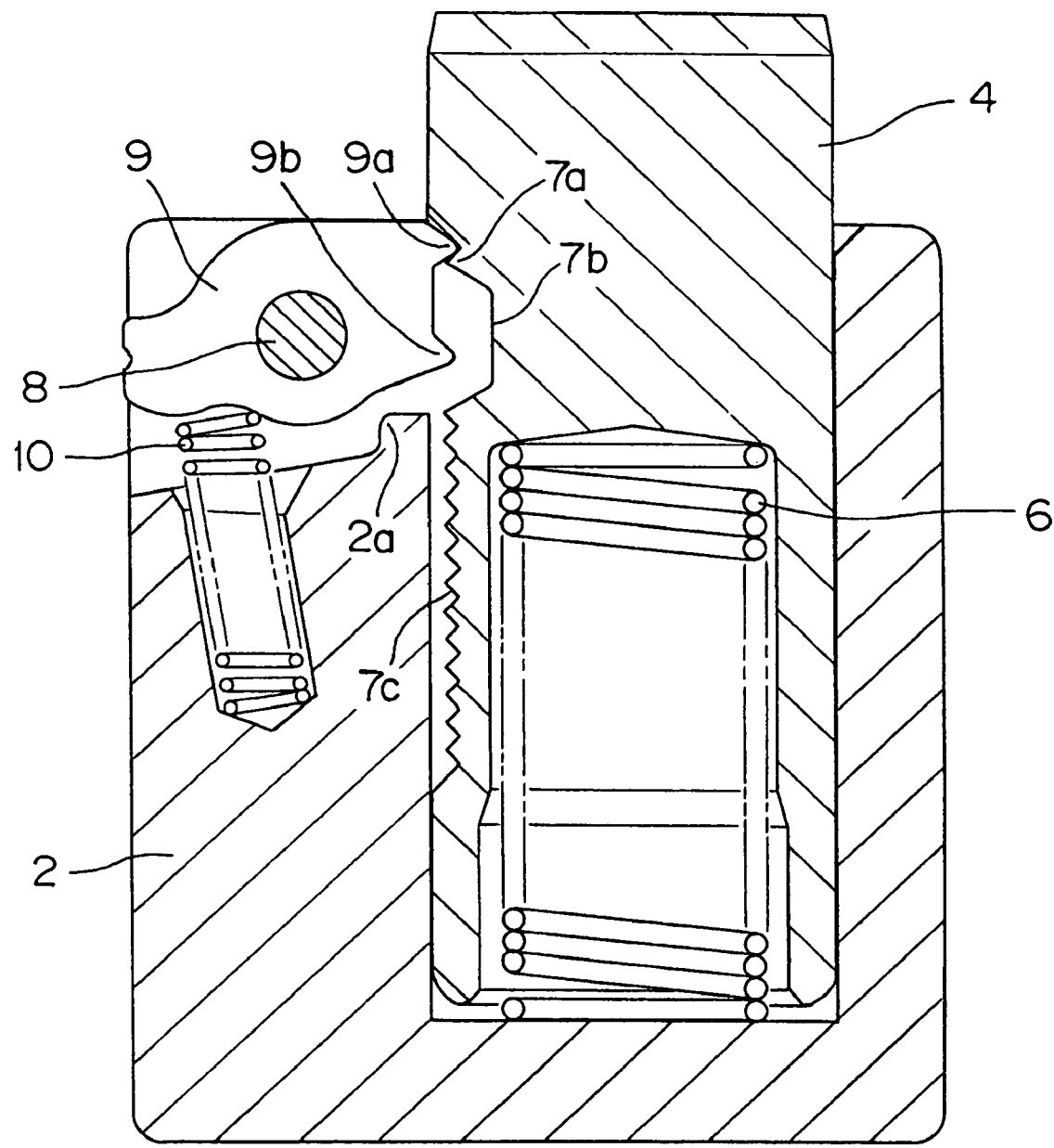
FIG. 4 is a cross-sectional view showing the tensioner in its initial state.

As shown in FIGS. 2 and 4, a protrusion 2a is provided on the tensioner body 2 adjacent pawl 9 for the purpose of limiting the pivoting movement of the pawl under the biasing action of spring 10, so that, when the ratchet 9 is pivoted by the biasing action of spring 10, its tooth 9a does not come into contact with the bottom of recess 7b. By preventing excessive pivoting movement of the pawl, the protrusion 2a also prevents the pawl biasing spring 10 from jumping out of its retaining hole 10a (FIG. 2).

As shown in FIG. 4, when the tensioner is shipped and transported, and when it is being mounted on an engine either during assembly or during engine repair, the first pawl tooth 9a of the ratchet 9 engages with tooth 7a at the front of the rack 7 so that the plunger 4 is maintained in a retracted condition in the plunger accommodating hole 3 and does not jump out of the hole. Locking pins (not shown) may be removably inserted into holes formed in the pawl and tensioner body to prevent the pawl from pivoting until the ratchet is installed and in proper engagement with a tensioner lever or the like. Suitable locking means for the ratchet are well known and disclosed, for example, in U.S. Pat. No. 6,612,951, the disclosure of which is incorporated by reference.

When the tensioner 1 is mounted on an engine while in the state shown in FIG. 4, the ratchet 9 may be pivoted slightly counterclockwise to disengage the first pawl tooth 9a from tooth 7a. The pawl 9 is then biased clockwise by spring 10 until it abuts protrusion 2a on the tensioner body as shown in FIG. 1. Then, the first pawl tooth 9a opposite to the flat portion of recess 7b does not engage any of the rack teeth on the plunger 4, and the plunger can move freely in the protruding and retracting directions through a range 12 as shown in FIG. 5. As mentioned above, since the pawl 9 abuts the protrusion 2a, excessive pivoting movement of the pawl 9 is blocked, so that spring 10 cannot jump out of its hole 10a (FIG. 2).

When the first pawl tooth 9a is located within recess 7b but out of contact with the flat bottom of the recess, the plunger 4 is biased so as to protrude forward from the tensioner body 2, and applies proper tension to the slack side of a chain (for example a timing chain, not shown) so that the chain cannot become excessively loose, vibrate, or disengage from its sprockets. Even if a large amount flutter is generated in the chain, the first pawl tooth 9a does not engage rack teeth 7c.

Thus, the backstop mechanism 11 does not function while the plunger is operating within range 12, and excessive tension is not applied to the chain.

When the chain becomes elongated after a period of operation in which the plunger is free to protrude and retract within range 12, the plunger 4 gradually protrudes beyond range 12, and the first pawl tooth 9a engages a rack tooth 7c as shown in FIG. 6. As the plunger moves forward still farther in response to elongation of the chain the first pawl tooth 9a passes over a rack tooth 7c to engage with a next rack tooth, and so on. Retraction of the plunger is blocked by the backstop mechanism 11 when the plunger is within a range 13 shown in FIG. 6. As a result, the plunger 4 applies proper tension to the chain as the chain gradually elongates, and thereby prevents jumping of the chain over the sprocket teeth.

In the operation of the tensioner described above and shown in FIGS. 1-6, since the recess 7b is not engaged by the pawl, and rack teeth 7c are engageable by the pawl, the plunger can reciprocate freely in a region 12 during the initial stages of the useful life of a transmission chain, but the backstop mechanism becomes active when the chain becomes sufficiently elongated that the plunger extends into region 13. Thus, excessive tensioning of the chain is prevented, but, as the chain becomes elongated, jumping of the sprocket teeth by the chain can be prevented. The tensioner, therefore, can be adapted to an engine which requires a backstop mechanism that has both a non-operating range, and an operating range in which it becomes effective as the chain becomes elongated.

The ratchet type tensioner of the invention can be used with a pivoted tensioner lever arranged so that the plunger of the tensioner presses against a back surface of the lever, thereby urging a shoe on the lever into sliding contact with a traveling chain. Alternatively, a member adapted for sliding contact with a travelling chain can be mounted directly on the front end of the plunger.

We claim:

1. A ratchet tensioner comprising:
   a tensioner body having a plunger-accommodating hole;
   a plunger slidable in a longitudinal direction in the plunger-accommodating hole and protruding therefrom, the plunger having a front end protruding from the plunger-accommodating hole and a rear end within the plunger-accommodating hole;
   a plunger spring urging the plunger in the protruding direction;
   a ratchet mechanism comprising a toothed rack having a set of rack teeth formed on the plunger and arranged in a longitudinal row, a pawl pivotably supported on the tensioner body for engagement with the rack teeth, and a spring biasing the pawl toward the rack teeth for limiting movement of the plunger in a retracting direction; and
   a recess formed in the plunger at a location between the toothed rack and the front end of the plunger, the recess having a bottom wall and being deeper than the tooth gap bottoms of the rack, whereby the pawl can enter the recess without engaging the bottom wall, and permit the plunger to move freely in both its protruding and retracting directions through a limited range;
   in which a protrusion engageable by the pawl is formed on the tensioner body to limit pivoting movement of the pawl, thereby preventing the pawl from contacting the bottom wall of the recess in the plunger when the pawl enters the recess.

2. A ratchet tensioner comprising:
   a tensioner body having a plunger-accommodating hole;
   a plunger slidable in a longitudinal direction in the plunger-accommodating hole and protruding therefrom, the plunger having a front end protruding from the plunger-accommodating hole and a rear end within the plunger-accommodating hole;
   a plunger spring urging the plunger in the protruding direction; and
   a ratchet mechanism comprising a toothed rack having a set of rack teeth formed on the plunger and arranged in a longitudinal row, a pawl pivotably supported on the tensioner body for engagement with the rack teeth, and a spring biasing the pawl toward the rack teeth for limiting movement of the plunger in a retracting direction; and
   a recess formed in the plunger at a location between the toothed rack and the front end of the plunger, the recess having a bottom wall and being deeper than the tooth gap bottoms of the rack, whereby the pawl can enter the recess without engaging the bottom wall, and permit the plunger to move freely in both its protruding and retracting directions through a limited range;
   in which the plunger is provided with an additional tooth at a located between the recess and the front end of the plunger, and in which the pawl is engageable with the additional tooth to hold the plunger in a fully retracted position to prevent the plunger from jumping out of the plunger-accommodating hole prior to installation of the tensioner in an engine.

3. A ratchet tensioner according to claim 2, in which a protrusion engageable by the pawl is formed on the tensioner body to limit pivoting movement of the pawl, thereby preventing the pawl from contacting the bottom wall of the recess in the plunger when the pawl enters the recess.

* * * * *